United States Patent
Onoue et al.

(10) Patent No.: US 7,016,758 B2
(45) Date of Patent: Mar. 21, 2006

(54) MACHINING PROGRAM TRANSMISSION METHOD AND MACHINING PROGRAM TRANSMISSION SYSTEM

(75) Inventors: Hiromi Onoue, Kyoto (JP); Koji Kuga, Kyoto (JP); Masahiro Komatsu, Yamatokoriyama (JP)

(73) Assignees: Nichidai Corporation, Kyoto (JP); Mori Seiki Co., Ltd., Nara (JP)

( * ) Notice: Subject to any disclaimer, the term of this patent is extended or adjusted under 35 U.S.C. 154(b) by 0 days.

(21) Appl. No.: 10/986,955

(22) Filed: Nov. 15, 2004

(65) Prior Publication Data

US 2005/0107908 A1   May 19, 2005

(30) Foreign Application Priority Data

Nov. 17, 2003   (JP)   ............................. 2003-387044

(51) Int. Cl.
*G06F 19/00* (2006.01)
(52) U.S. Cl. .................................. 700/159; 235/462.15
(58) Field of Classification Search ................ 700/180, 700/86, 96, 115–117, 159; 235/462.01, 462.15
See application file for complete search history.

(56) References Cited

U.S. PATENT DOCUMENTS

| | | | | |
|---|---|---|---|---|
| 5,262,954 A | * | 11/1993 | Fujino et al. | ................ 700/112 |
| 5,283,749 A | * | 2/1994 | Tanahashi | ................... 700/159 |
| 5,530,857 A | * | 6/1996 | Gimza | .......................... 707/10 |
| 6,490,498 B1 | * | 12/2002 | Takagi | ......................... 700/159 |
| 6,675,059 B1 | * | 1/2004 | Scott | .......................... 700/166 |
| 2003/0208293 A1 | * | 11/2003 | Mountcastle et al. | ......... 700/96 |
| 2004/0222300 A1 | * | 11/2004 | Strickland | .............. 235/462.15 |

FOREIGN PATENT DOCUMENTS

| | | |
|---|---|---|
| JP | 11-70443 | 3/1999 |
| JP | 11-296217 | 10/1999 |

\* cited by examiner

*Primary Examiner*—Zoila Cabrera
(74) *Attorney, Agent, or Firm*—Westerman, Hattori, Daniels & Adrian, LLP

(57) ABSTRACT

A machining program transmission system 1 has a control device of an NC machine tool 10, a transmission device 20 and a terminal device 40 are connected via an electrical communication line 2. The terminal device 40 reads an identification information 31 of a machining program, the identification information being attached to a medium 32. The terminal device 40 also reads an identification information 18 of the NC machine tool 10, the identification information being attached to the NC machine tool 10 for carrying out the machining. The terminal device 40 transmits the information to the transmission device 20. The transmission device 20 transmits the machining program corresponding to the program identification information 31 to the NC machine tool 10 corresponding to the machine identification information 18. The control device of the NC machine tool 10 receives and stores the machining program.

4 Claims, 4 Drawing Sheets

| MACHINE NUMBER | DESTINATION ADDRESS |
|---|---|
| ABC123 | *** |
| ABC456 | *** |
| ABC789 | *** |
| DEF123 | *** |
| DEF456 | *** |
| DEF789 | *** |
| ⋮ | ⋮ |

MACHINING PROGRAM TRANSMISSION METHOD AND MACHINING PROGRAM TRANSMISSION SYSTEM

BACKGROUND OF THE INVENTION

1. Field of the Invention

The present invention relates to a machining program transmission method and a machining program transmission system, comprising one or more NC machine tools being controlled on the basis of machining programs, a transmission device for transmitting the machining programs and a terminal device for issuing requests for transmitting the machining programs, the NC machine tools, the transmission device and the terminal device being connected mutually via an electrical communication line, and the machining program transmission method and system being configured so as to transmit the machining programs from the transmission device to the NC machine tools via the electrical communication line according to the request from the terminal device.

2. Description of the Prior Art

An NC machine tool comprises a main spindle device, a feed mechanism section, etc. and further comprises a machining operation mechanism section for machining a workpiece into a desired shape, a control device for controlling the machining operation mechanism section on the basis of a machining program or the like generated to meet the requirements for the above-mentioned workpiece, and an operation panel connected to the control device.

The above-mentioned machining program has been generated by a programmer well informed about this program using a programming device. Conventionally, the generated machining program is stored in the control device of the NC machine tool as described below (Japanese Laid-open Patent Application No. Hei 11-296217).

In other words, the programming device and the control device of the NC machine tool are mutually connected via a network, such as a LAN. The machining program generated in the programming device is transmitted from the programming device to the control device via the network and stored in the control device by operation from the operation panel of the NC machine tool.

More specifically, since various machining programs corresponding to various types of workpieces are stored in the programming device, the list of the program numbers of the machining programs stored in the programming device is first displayed on the display screen of the operation panel. Then, when a desired program number is selected as necessary from among the displayed program numbers by the operator via the operation panel, the machining program corresponding to the selected program number is transmitted from the programming device to the control device via the network and stored in the control device.

As a result, a plurality of machining programs transmitted in this way from the programming device are stored in the control device. When machining a workpiece, the operator selects the machining program corresponding to the workpiece from among the plurality of machining programs and starts the machining program, whereby the workpiece is machined into a desired shape.

However, when the machining program is transmitted from the programming device to the control device as described above, the operation conducted by the operator, that is, the selection and designation of the desired program number from the list of the program numbers of the machining programs stored in the programming device, is not efficient, and a wrong machining program not corresponding to the workpiece to be machined may be selected, designated and transmitted to the control device owing to operator error. These problems are caused by the conventional method and system.

If the operator starts the wrong machining program not corresponding to the workpiece in order to machine the workpiece without noticing the error, improper machining occurs, or a serious accident, such as a collision between the tool and the workpiece, may be caused.

In addition, management must be carried out as necessary as to whether each of the plurality of machining programs stored in the control device is the newest or not, that is, whether the corresponding machining program stored in the programming device has been modified, edited or not, and it is also required to know as necessary which machining program corresponds to which workpiece. These problems are also caused by the conventional method and system.

In consideration of the above-mentioned circumstances, the present invention is intended to provide a machining program transmission method and a machining program transmission system capable of transmitting a correct machining program corresponding to the machining to be carried out by the NC machine tool by simple operation and also capable of simplifying the management of the machining program.

SUMMARY OF THE INVENTION

The present invention for accomplishing the above-mentioned object relates to a machining program transmission method for a system comprising one or more NC machine tools having a machining operation mechanism section for machining a workpiece into a desired shape and a control device for controlling the machining operation mechanism section on the basis of a machining program, a transmission device for transmitting the machining program, and a terminal device for requesting the transmission of the machining program, the NC machine tools, the transmission device and the terminal device being connected mutually via an electrical communication line, and the machining program being transmitted from the transmission device to each NC machine tool via the electrical communication line according to the request from the terminal device, comprising:

a step of attaching an identification information of the machining program used for machining to a medium on which information regarding the machining to be carried out by the NC machine tool is recorded, a step of reading a program identification information attached to the medium using the terminal device, inputting the identification information of the NC machine tool for carrying out the machining recorded on the medium into the terminal device, and transmitting the program identification information and machine identification information from the terminal device to the transmission device via the electrical communication line, a step of transmitting the machining program corresponding to the program identification information from the transmission device to the NC machine tool corresponding to the machine identification information via the electrical communication line on the basis of the program identification information and the machine identification information transmitted from the terminal device, and a step of storing the machining program transmitted from the transmission device in the control device of the NC machine tool.

The above-mentioned machining program transmission method can be carried out successfully by a machining program transmission system described below.

In other words, this machining program transmission system comprises one or more NC machine tools having a machining operation mechanism section for machining a workpiece into a desired shape and a control device for controlling the machining operation mechanism section on the basis of a machining program, a transmission device for transmitting the machining program, and a terminal device for requesting the transmission of the machining program, the NC machine tools, the transmission device and the terminal device being connected mutually via an electrical communication line, and the machining program being transmitted from the transmission device to each NC machine tool via the electrical communication line according to the request from the terminal device, wherein the terminal device comprises a reading section for reading the identification information of the machining program used for machining, the identification information being attached to a medium on which information regarding the machining to be carried out by the NC machine tool is recorded, an input section for inputting the identification information of the NC machine tool for carrying out the machining recorded on the medium, a transmission control section for transmitting the program identification information read by the reading section and the machine identification information input from the input section to the transmission device via the electrical communication line, the transmission device comprises a program storage section for storing the machining program, and a transmission/reception control section for receiving the program identification information and the machine identification information transmitted from the terminal device, reading the machining program corresponding to the received program identification information from the program storage section, and transmitting the readout machining program to the NC machine tool corresponding to the received machine identification information via the electrical communication line, and the control device of the NC machine tool comprises a program storage section for storing the machining program, and a reception control section for receiving the machining program transmitted from the transmission device and storing the received machining program in the program storage section.

With these inventions, the information regarding the machining to be carried out by the NC machine tool is recorded on the medium, and the identification information of the machining program to be used for the machining is attached to the medium.

The medium includes, for example, a paper medium, such as a production instruction sheet created on the basis of a predetermined production plan and describing a workpiece to be machined by the NC machine tool, its machining schedule, the number of the workpieces to be machined, etc., and a machining drawing sheet showing the machined shape of the workpiece, and computer-readable recording media, such as a card, a tag and a film equipped with an IC chip, and a magnetic card. However, the medium is not limited to these.

In the case when the machining program identification information is attached to the paper medium, a label indicating the identification information may be attached or affixed to the paper medium, the identification information may be directly indicated on the paper medium, or a computer-readable recording medium on which the identification information is stored may be attached to the paper medium. Furthermore, the machining program identification information may be attached to the computer-readable recording medium without using the paper medium, by storing the machining program identification information together with data regarding the instruction contents of the production instruction sheet, the machining drawing, etc. on the computer-readable recording medium.

Then, the operator at the production site carries out machining according to the information recorded on the medium. At the time of the machining, a transmission request for the machining program that is used for the machining is first issued from the terminal device to the transmission device by the operator.

More specifically, the operator makes the reading section of the terminal device read the program identification information attached to the medium and inputs the identification information of the NC machine tool for carrying out the machining recorded on the medium from the input section of the terminal device to the terminal device.

Then, the program identification information read by the reading section and the machine identification information input from the input section are transmitted to the transmission device via the electrical communication line by the transmission control section of the terminal device. In this way, the transmission request for the machining program is issued to the transmission device.

The program identification information and the machine identification information transmitted from the terminal device are received by the transmission/reception control section of the transmission device, and the machining program corresponding to the received program identification information is read from the program storage section by the transmission/reception control section. Then, the readout machining program is transmitted to the NC machine tool corresponding to the received machine identification information via the electrical communication line.

The machining program transmitted from the transmission device is received by the reception control section of the control device of the NC machine tool, and the received machining program is stored in the program storage section by the reception control section.

Then, the operator starts the machining program stored as described above in the program storage section of the control device, whereby the machining recorded on the medium can be carried out by the NC machine tool.

The program identification information includes the program number or the program name set for each machining program, the drawing number of the machining drawing showing the machined shape of the workpiece to be machined by running the machining program, etc. In addition, the machine identification information includes the machine number or the like set for each NC machine tool. However, the information is not limited to these.

Hence, according to the machining program transmission method and the machining program transmission system in accordance with the present invention, the identification information of the machining program that is used for the machining to be carried out by the NC machine tool is attached to the medium on which the information regarding the machining is recorded, and the program identification information attached to the medium is read by the terminal device, whereby the machining program requested to be transmitted is designated. Therefore, input operation by the operator can be made unnecessary, and the correct machining program corresponding to the machining in the NC machine tool can be transmitted from the transmission device to the NC machine tool by simple operation.

In addition, each time the machining is carried out according to the information recorded on the medium, the operator should only perform operation so that the machining program is transmitted from the transmission device to the NC machine tool as described above. Hence, it is not necessary to carry out management as necessary as to whether the machining program stored in the program storage section of the NC machine tool is the newest or not, that is, whether the corresponding machining program stored in the program storage section of the transmission device has been modified, edited or not. The management can thus be omitted.

Furthermore, only the machining program corresponding to the machining being carried out at present should only be stored in the program storage section of the NC machine tool. Hence, unlike the case of storing a plurality of machining programs, it is not necessary to know as necessary which machining program corresponds to which workpiece. Moreover, it is possible to prevent the starting of a wrong machining program not corresponding to the desired machining.

Still further, the programmer who generates machining programs should manage only the machining programs stored in the program storage section of the transmission device. The machining program stored in the program storage section of the NC machine tool is not required to be managed, even in the case when the corresponding machining program stored in the program storage section of the transmission device has been modified, edited or not. The management of the machining program is thus performed effectively.

The identification information of the NC machine tool may be attached to the NC machine tool and may be read by the reading section of the terminal device. With this configuration, the NC machine tool that is the destination of the machining program can be designated by making the terminal device read the identification information of the NC machine tool. Hence, the input operation by the operator can be made unnecessary, and the machining program can be transmitted from the transmission device to the NC machine tool by further simpler operation.

DESCRIPTION OF THE PREFERRED EMBODIMENT

Figure 1:
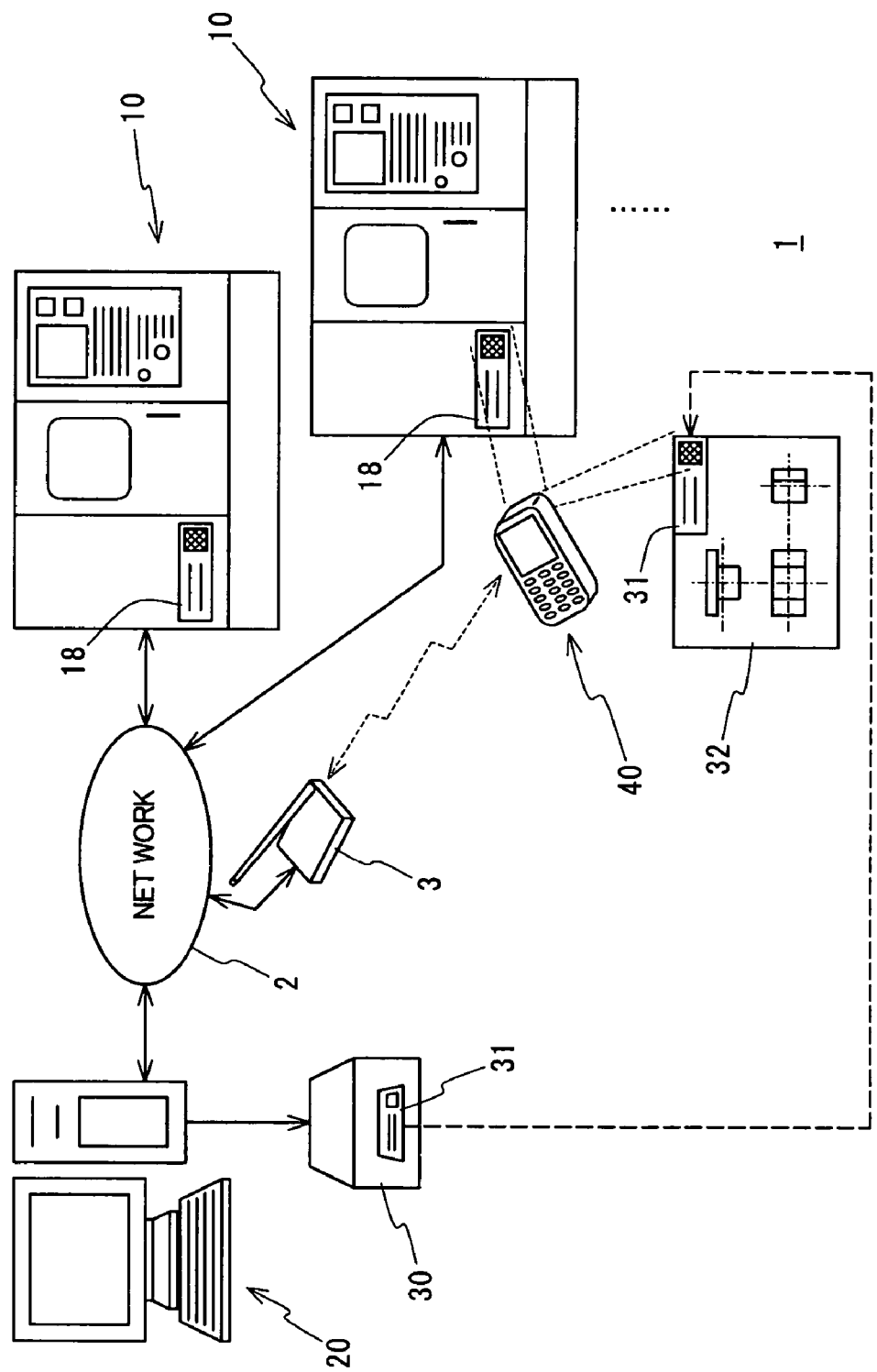
FIG. 1 is an illustrative view showing the outline configuration of a machining program transmission system in accordance with an embodiment of the present invention.
Figure 2:
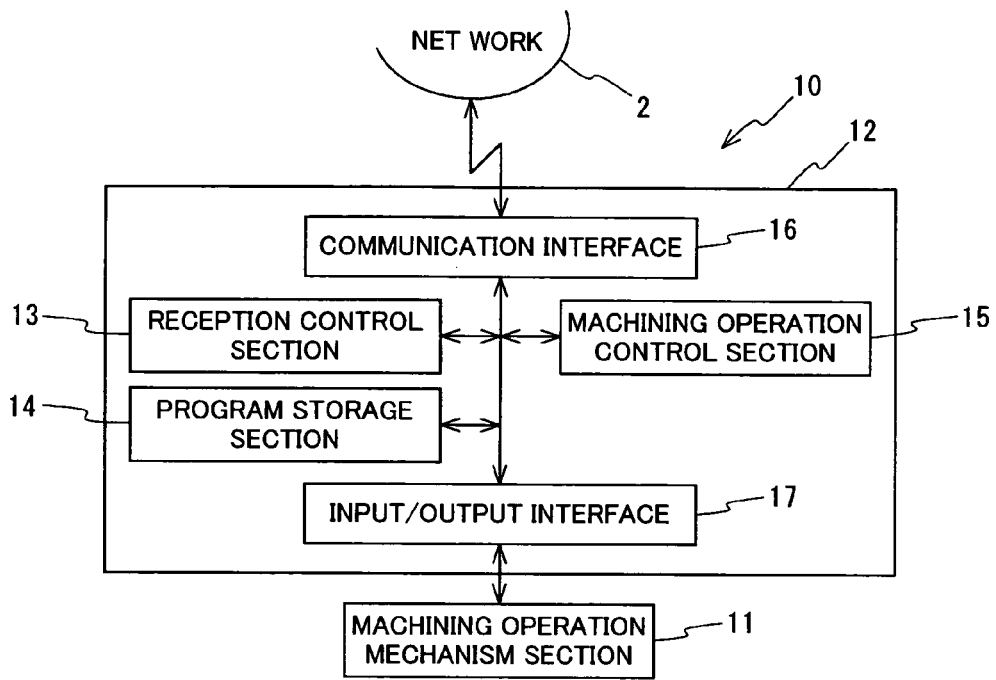
FIG. 2 is a block diagram showing the outline configuration of an NC machine tool in accordance with this embodiment.
Figure 3:
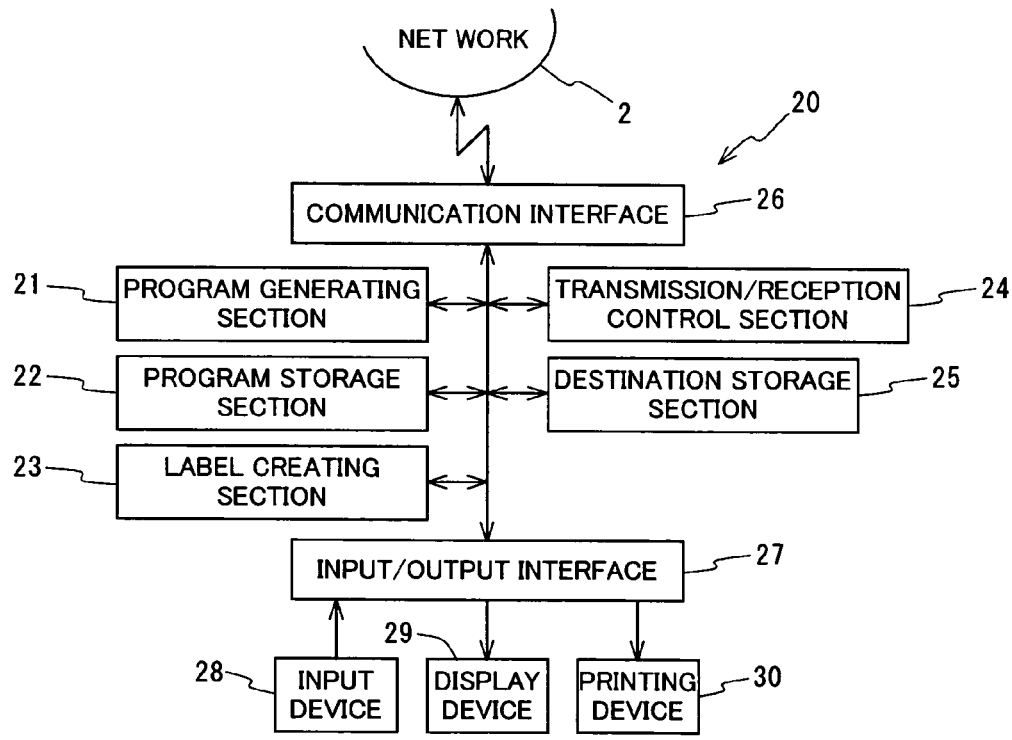
FIG. 3 is a block diagram showing the outline configuration of a programming device in accordance with this embodiment.
Figures 4, 5:
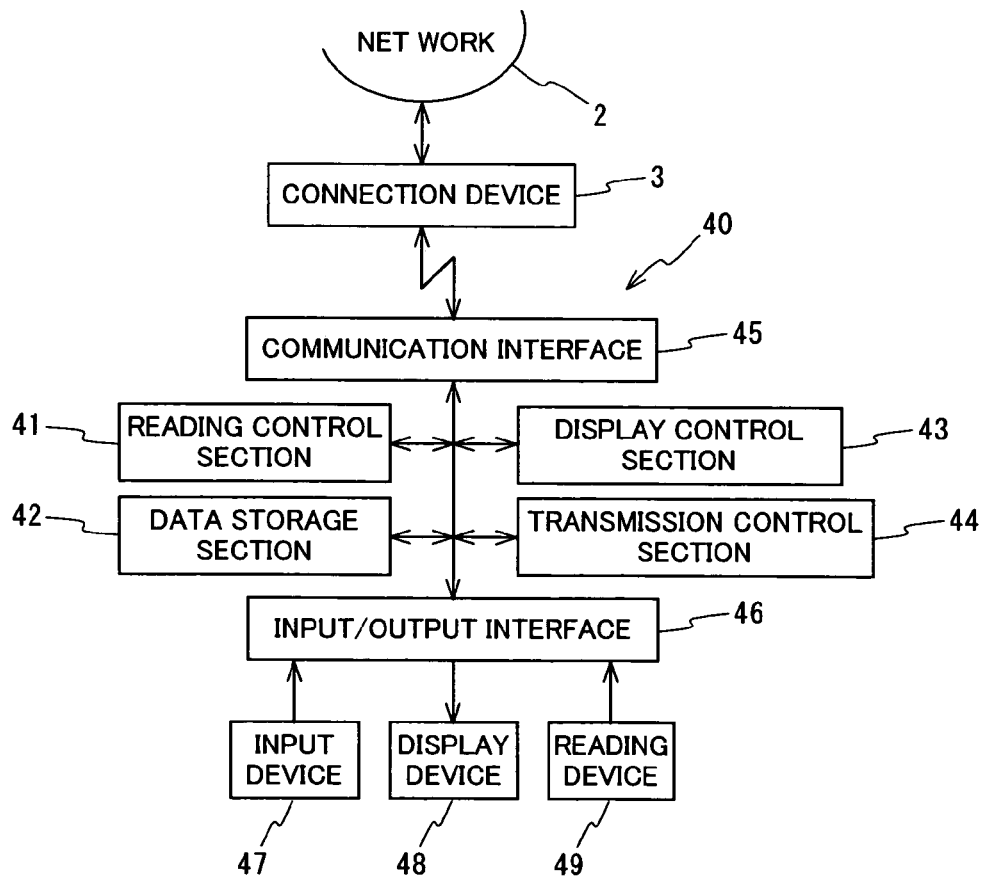
FIG. 4 is an illustrative view showing an example of a data table to be stored in a destination storage section in accordance with this embodiment.
FIG. 5 is a block diagram showing the outline configuration of a terminal device in accordance with this embodiment.

A preferred embodiment in accordance with the present invention will be described below on the basis of the accompanying drawings. FIG. 1 is an illustrative view showing the outline configuration of a machining program transmission system in accordance with an embodiment of the present invention. In addition, FIG. 2 is a block diagram showing the outline configuration of an NC machine tool in accordance with this embodiment, FIG. 3 is a block diagram showing the outline configuration of a programming device in accordance with this embodiment, and FIG. 4 is an illustrative view showing an example of a data table to be stored in a destination storage section in accordance with this embodiment. Furthermore, FIG. 5 is a block diagram showing the outline configuration of a terminal device in accordance with this embodiment.

As shown in FIG. 1, a machining program transmission system 1 in accordance with this embodiment comprises a plurality of NC machine tools 10 installed at a production site and controlled on the basis of machining programs, a programming device 20 for generating machining programs, and a terminal device 40 for issuing machining program transmission requests to the programming device 20 so that machining programs are transmitted from the programming device 20 to the NC machine tools 10. The NC machine tools 10, the programming device 20 and the terminal device 40 are mutually connected via a network 2, such as a LAN.

As shown in FIGS. 1 and 2, the NC machine tool 10 comprises a machining operation mechanism section 11, having a main spindle device, a feed mechanism section, etc., for machining a workpiece into a desired shape, and a control device 12 for controlling the machining operation mechanism section 11.

The control device 12 comprises a reception control section 13, a program storage section 14, a machining operation control section 15, a communication interface 16, an input/output interface 17, etc. The control device 12 is connected to the above-mentioned network 2 via the communication interface 16 and also connected to the machining operation mechanism section 11 via the input/output interface 17.

The reception control section 13 receives a machining program transmitted from the programming device 20 via the network 2 and the communication interface 16, and stores the received machining program in the program storage section 14. The machining operation control section 15 controls the machining operation mechanism section 11 on the basis of the machining program stored as described above in the program storage section 14.

Figure 6:
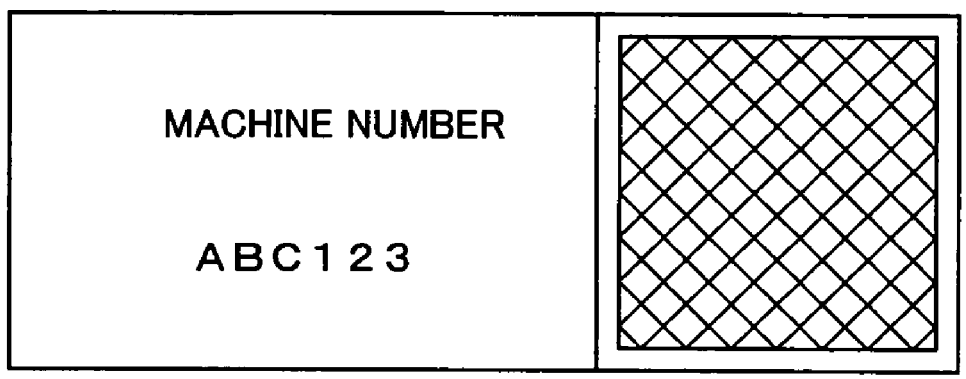
FIG. 6 is an illustrative view showing a label to be attached to an NC machine tool.

In addition, a machine number is set for each NC machine tool 10 for identification. As shown in FIG. 6, a label 18 indicating the machine number and a machine identification code (bar code or two-dimensional code) obtained by coding the machine number is created as necessary in advance, and attached to the NC machine tool 10.

As shown in FIGS. 1 and 3, the programming device 20 comprises a program generating section 21, a program storage section 22, a label creating section 23, a transmission/reception control section 24, a destination storage section 25, a communication interface 26, an input/output interface 27, an input device 28, a display device 29, a printing device 30, etc. The input device 28, the display device 29, the printing device 30, etc. are connected to the input/output interface 27. The programming device 20 is connected to the network 2 via the communication interface 26.

The program generating section 21 generates a machining program interactively or automatically on the basis of data regarding the shape of a workpiece after machining, the shape of the workpiece before machining, the material of the workpiece, the type of a tool, the material of the tool, machining conditions, etc. having been input as necessary from the input device 28 according to input instructions indicated on the display device 29. The program storage section 22 stores a plurality of machining programs generated as described above by the program generating section 21.

To the machining program, the drawing number of a machining drawing showing the machined shape of a workpiece to be machined by running the machining program is set for identification. The machining program is managed according to this drawing number.

Figure 7:
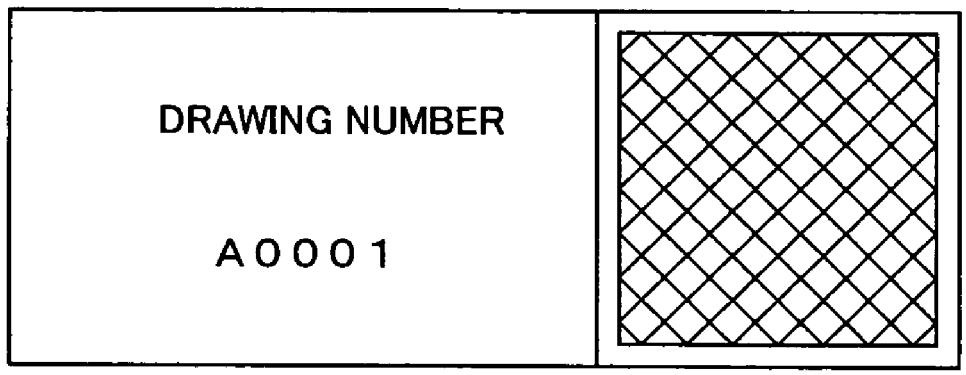
FIG. 7 is an illustrative view showing a label to be attached to a machining drawing.

For a machining program selected as necessary by the input from the input device 28 from among the machining programs stored in the program storage section 22, the label creating section 23 creates a label 31 indicating its drawing number and a drawing number identification code (bar code or two-dimensional code) obtained by coding the drawing number as shown in FIG. 7. The created label 31 is output from the printing device 30.

The label 31 created by the label creating section 23 and output from the printing device 30 as described above is attached to a machining drawing 32 showing the machined shape and the like of the workpiece, for example. The drawing number identification code may be printed directly on the machining drawing 32.

In the destination storage section 25, machine number data input as necessary from the input device 28 and destination address data preset for each of the NC machine tools 10 are related mutually and stored as such a data table as shown in FIG. 4.

The transmission/reception control section 24 is a processing section for transmitting a machining program to the NC machine tool 10 according to a transmission request from the terminal device 40. The transmission/reception control section 24 receives the machine number data and the drawing number data transmitted from the terminal device 40 and then starts the transmission processing as described later.

In other words, after receiving the machine number data and the drawing number data transmitted from the terminal device 40 via the network 2 and the communication interface 26, the transmission/reception control section 24 first refers to the data stored in the destination storage section 25 on the basis of the received machine number data, reads the destination address data corresponding to the machine number data, and also reads the machining program corresponding to the drawing number data from the program storage section 22 on the basis of the received drawing number data.

Then, the transmission/reception control section 24 transmits the readout machining program to the corresponding NC machine tool 10 via the communication interface 26 and the network 2 on the basis of the above-mentioned readout destination address data.

As shown in FIGS. 1 and 5, the terminal device 40 comprises a reading control section 41, a data storage section 42, a display control section 43, a transmission control section 44, a communication interface 45, an input/output interface 46, an input device 47, a display device 48, a reading device 49, etc. The input device 47, the display device 48, the reading device 49, etc. are connected to the input/output interface 46. The terminal device 40 is connected to the network 2 via the communication interface 45.

The terminal device 40 is configured so as to be connected to the network 2 wirelessly. Hence, a connection device 3 for carrying out data transmission and reception between the network 2 and the terminal device 40 is connected to the network 2 as necessary.

The reading control section 41 reads the machine identification code indicated on the label 18 of the NC machine tool 10 and the drawing number identification code indicated on the label 31 of the machining drawing 32 via the reading device 49. Then, the reading control section 41 stores the readout data (the machine number data and the drawing number data) in the data storage section 42. The reading control section 41 and the reading device 49 correspond to the reading section.

The display control section 43 displays the machine number data, the drawing number data, etc. stored in the data storage section 42 on the display device 48. After receiving a transmission signal input from the input device 47 and indicating that data transmission to the programming device 20 is enabled, the transmission control section 44 transmits the machine number data and the drawing number data stored in the data storage section 42 to the programming device 20 via the communication interface 45, the connection device 3 and the network 2.

In the machining program transmission system 1 of this embodiment configured as described above, when the workpiece shown in the machining drawing 32 is machined, a transmission request for the machining program that is used to machine the workpiece is first issued from the terminal device 40 to the programming device 20 by the operator at the production site.

More specifically, the operator first makes the reading control section 41 and the reading device 49 of the terminal device 40 read the drawing number identification code indicated on the label 31 of the machining drawing 32 and also read the machine identification code indicated on the label 18 of the NC machine tool 10 that is used to machine the workpiece shown in the machining drawing 32. The machine number data and the drawing number data read by the reading control section 41 and the reading device 49 are stored in the data storage section 42 and displayed on the display device 48 by the display control section 43.

After confirming the machine number data and the drawing number data displayed on the display device 48, the operator inputs a transmission signal from the input device 47. When this signal is received by the transmission control section 44, the machine number data and the drawing number data stored in the data storage section 42 are transmitted to the programming device 20 by the transmission control section 44 via the communication interface 45, the connection device 3 and the network 2. In this way, the transmission request for the machining program is issued to the programming device 20.

When the machine number data and the drawing number data transmitted from the terminal device 40 are received by the transmission/reception control section 24 of the programming device 20 via the network 2 and the communication interface 26, the data stored in the destination storage section 25 is first referred to on the basis of the received machine number data, the destination address data corresponding to the machine number data is read, and the machining program corresponding to the drawing number data is read from the program storage section 22 on the basis of the received drawing number data by the transmission/reception control section 24.

Then, the readout machining program is transmitted on the basis of the readout destination address data to the NC machine tool 10 corresponding to the destination address data via the communication interface 26 and the network 2 by the transmission/reception control section 24.

A plurality of machining programs generated in advance by the program generating section 21 are stored in the program storage section 22. The machine number data and the destination address data set for each NC machine tool 10 are stored in advance in the destination storage section 25 so as to be related mutually.

When the machining program transmitted from the programming device 20 is received by the reception control section 13 of the NC machine tool 10 via the network 2 and the communication interface 16, the received machining program is stored in the program storage section 14 by the reception control section 13.

Then, the operator starts the machining program stored as described above in the program storage section 14 of the control device 12, whereby the workpiece shown in the machining drawing 32 can be machined by the NC machine tool 10.

Hence, according to the machining program transmission system 1 of this embodiment, the drawing number of the machining drawing 32 showing the workpiece to be machined is coded and directly printed on the machining drawing 32, or the coded drawing number is indicated on the label 31 and the label 31 is attached to the machining drawing 32. The drawing number identification code on the machining drawing 32 is read by the terminal device 40, whereby the machining program that is requested to be transmitted is designated. Furthermore, the machine number of the NC machine tool 10 is coded and indicated on the label 18, and the label 18 is attached to the NC machine tool 10. The machine identification code on the label 18 of this NC machine tool 10 is read by the terminal device 40, whereby the machine number of the NC machine tool 10 that is the destination of the machining program is designated. Therefore, input operation by the operator can be made unnecessary, and the correct machining program corresponding to the workpiece to be machined can be transmitted from the programming device 20 to the NC machine tool 10 by simple operation.

In addition, each time a workpiece is machined according to the machining drawing 32, the operator should only perform operation so that the machining program is transmitted from the programming device 20 to the NC machine tool 10 as described above. Hence, it is not necessary to carry out management as necessary as to whether the machining program stored in the program storage section 14 of the NC machine tool 10 is the newest or not, that is, whether the corresponding machining program stored in the program storage section 22 of the programming device 20 has been modified, edited or not. The management can thus be omitted.

Furthermore, only the machining program corresponding to the workpiece being machined at present should only be stored in the program storage section 14 of the NC machine tool 10. Hence, unlike the case of storing a plurality of machining programs, it is not necessary to know as necessary which machining program corresponds to which workpiece. Moreover, it is possible to prevent the starting of a wrong machining program not corresponding to the workpiece to be machined.

Still further, the programmer who generates machining programs should manage only the machining programs stored in the program storage section 22 of the programming device 20. The machining program stored in the program storage section 14 of the NC machine tool 10 is not required to be managed, even in the case when the corresponding machining program stored in the program storage section 22 of the programming device 20 has been modified, edited or not. The management of the machining program is thus performed effectively.

An embodiment in accordance with the present invention has been described above. However, any specific embodiments that can be accomplished by the present invention are not limited to this embodiment at all.

The above-mentioned embodiment has a configuration wherein the machine number identifying the NC machine tool 10 is coded and indicated on the label 18 and the label 18 is attached to the NC machine tool 10, and the machine identification code on the label 18 of the NC machine tool 10 is read by the terminal device 40, whereby the machine number of the NC machine tool 10 that is the destination of the machining program is designated. However, the configuration of the embodiment is not limited to this configuration, but the embodiment can be configured without attaching this kind of label 18 to the NC machine tool 10.

In this case, the terminal device 40 is configured so that data regarding the machine number of the NC machine tool 10, which is input from the input device 47 by the operator, is stored in the data storage section 42.

Furthermore, the label 31 is attached to the machining drawing 32 in the above-mentioned embodiment. However, the present invention is not limited to this. The label 31 may be attached to a production instruction sheet created on the basis of a predetermined production plan and describing a workpiece to be machined by the NC machine tool 10, its machining schedule, the number of the workpieces to be machined, etc.

Moreover, in the above-mentioned embodiment, the drawing number of the machining drawing 32 is used as the identification information of the machining program. However, the identification information is not limited to this. The program number or the program name that is set for each machining program may also be used.

Still further, the above-mentioned embodiment has a configuration wherein the label 18 indicating the machine number of the NC machine tool 10 and the machine identification code obtained by coding the machine number is attached to the NC machine tool 10, and the label 31 indicating the drawing number of the machining drawing 32 and the drawing number identification code obtained by coding the drawing number is attached to the machining drawing 32. However, instead of the above-mentioned labels 18 and 31, the IC chip included in a card, a tag or a film, or the magnetic portion of a magnetic card may also be used to store the data regarding the machine number and the drawing number, and the card, tag or film may be attached to the NC machine tool 10 and the machining drawing 32. In this case, the above-mentioned terminal device 40 is configured so as to be able to read the data regarding the machine number and the drawing number stored in the IC chip or the magnetic portion of the magnetic card.

Still further, instead of the machining drawing 32 and the label 31, the IC chip included in a card, a tag or a film, or the magnetic portion of a magnetic card may be used to store the data regarding the drawing number specifying the machining program together with data regarding the instructions in the above-mentioned machining drawing 32 and the above-mentioned production instruction sheet. The information regarding the machining to be carried out by the NC machine tool 10 may be recognized by confirming the data stored in the IC chip or the magnetic portion of the magnetic card as necessary, or the identification information of the machining program may be recognized by making the terminal device 40 read the information, and then a machining program transmission request may be issued to the programming device 20. Even in this case, the above-mentioned terminal device 40 is configured so as to be able to read the data regarding the drawing number stored in the IC chip or the magnetic portion of the magnetic card.

What is claimed is:

1. A machining program transmission method for a system comprising one or more NC machine tools having a machining operation mechanism section for machining a workpiece into a desired shape and a control device for controlling said machining operation mechanism section on the basis of a machining program, a transmission device for transmitting said machining program, and a terminal device for requesting the transmission of said machining program, said NC machine tools, said transmission device and said terminal device being connected mutually via an electrical communication line, and said machining program being transmitted from said transmission device to each NC machine tool via said electrical communication line according to the request from said terminal device, comprising:

a step of attaching an identification information of the machining program used for machining to a medium on which information regarding the machining to be carried out by said NC machine tool is recorded, a step of reading a program identification information attached to said medium using said terminal device, inputting the identification information of said NC machine tool for carrying out the machining recorded on said medium into said terminal device, and transmitting said program identification information and said machine identification information from said terminal device to said transmission device via said electrical communication line, a step of transmitting the machining program corresponding to said program identification information from said transmission device to said NC machine tool corresponding to said machine identification information via said electrical communication line on the basis of said program identification information and said machine identification information transmitted from said terminal device, and a step of storing the machining program transmitted from said transmission device in the control device of said NC machine tool.

2. A machining program transmission method for a system comprising one or more NC machine tools having a machining operation mechanism section for machining a workpiece into a desired shape and a control device for controlling said machining operation mechanism section on the basis of a machining program, a transmission device for transmitting said machining program, and a terminal device for requesting the transmission of said machining program, said NC machine tools, said transmission device and said terminal device being connected mutually via an electrical communication line, and said machining program being transmitted from said transmission device to each NC machine tool via said electrical communication line according to the request from said terminal device, comprising:

a step of attaching an identification information of the machining program used for machining to a medium on which information regarding the machining to be carried out by said NC machine tool is recorded, a step of attaching an identification information of said NC machine tool to said NC machine tool, a step of reading the program identification information attached to said medium by using said terminal device, reading the machine identification information attached to said NC machine tool for carrying out the machining recorded on said medium, and transmitting said program identification information and said machine identification information from said terminal device to said transmission device via said electrical communication line, a step of transmitting the machining program corresponding to said program identification information from said transmission device to said NC machine tool corresponding to said machine identification information via said electrical communication line on the basis of said program identification information and said machine identification information transmitted from said terminal device, and a step of storing the machining program transmitted from said transmission device in the control device of said NC machine tool.

3. A machining program transmission system comprising one or more NC machine tools having a machining operation mechanism section for machining a workpiece into a desired shape and a control device for controlling said machining operation mechanism section on the basis of a machining program, a transmission device for transmitting said machining program, and a terminal device for requesting the transmission of said machining program, said NC machine tools, said transmission device and said terminal device being connected mutually via an electrical communication line, and said machining program being transmitted from said transmission device to each NC machine tool via said electrical communication line according to the request from said terminal device, wherein said terminal device comprises a reading section for reading an identification information of the machining program used for machining, said identification information being attached to a medium on which information regarding the machining to be carried out by said NC machine tool is recorded, an input section for inputting an identification information of said NC machine tool for carrying out the machining recorded on said medium, and a transmission control section for transmitting the program identification information read by said reading section and the machine identification information input from said input section to said transmission device via said electrical communication line, said transmission device comprises a program storage section for storing said machining program, and a transmission/reception control section for receiving the program identification information and the machine identification information transmitted from said terminal device, reading the machining program corresponding to the received program identification information from said program storage section, and transmitting the readout machining program to said NC machine tool corresponding to the received program identification information via said electrical communication line, and the control device of said NC machine tool comprises a program storage section for storing said machining program, and a reception control section for receiving the machining program transmitted from said transmission device and storing the received machining program in said program storage section.

4. A machining program transmission system comprising one or more one NC machine tools having a machining operation mechanism section for machining a workpiece into a desired shape and a control device for controlling said machining operation mechanism section on the basis of a machining program, a transmission device for transmitting said machining program, and a terminal device for requesting the transmission of said machining program, said NC machine tools, said transmission device and said terminal device being connected mutually via an electrical communication line, and said machining program being transmitted from said transmission device to each NC machine tool via the electrical communication line according to the request from said terminal device, wherein said terminal device comprises a reading section for reading an identification information of the machining program used for machining, said identification information being attached to a medium on which information regarding the machining to be carried out by said NC machine tool is recorded, and reading an identification information of said NC machine tool, said identification information being attached to said NC machine tool for carrying out the machining recorded on said medium, and a transmission control section for transmitting the program identification information and the machine identification information read by said reading section to said transmission device via said electrical communication line, said transmission device comprises a program storage section for storing said machining program, and a transmission/reception control section for receiving the program identification information and the machine identification information transmitted from said terminal device, reading the machining program corresponding to the received program identification information from said program storage section, and transmitting the readout machining program to said NC machine tool corresponding to the received program identification information via said electrical communication line, and the control device of said NC machine tool comprises a program storage section for storing said machining program, and a reception control section for receiving the machining program transmitted from said transmission device and storing the received machining program in said program storage section.

* * * * *